United States Patent [19]
Vitruk et al.

[11] Patent Number: 5,892,782
[45] Date of Patent: Apr. 6, 1999

[54] LASER WITH SPLIT-WAVE HYBRID RESONATOR

[75] Inventors: Peter Vitruk, Bothell; James Schemmer, Auburn; Stan Byron, Seattle, all of Wash.

[73] Assignee: Synrad, Inc., Mukilteo, Wash.

[21] Appl. No.: 931,249

[22] Filed: Sep. 16, 1997

[51] Int. Cl.⁶ .................................................... H01S 3/098
[52] U.S. Cl. ................................ 372/19; 372/64; 372/87
[58] Field of Search ................................ 372/19, 61, 64, 372/82, 83, 87

[56] References Cited

U.S. PATENT DOCUMENTS

| | | | |
|---|---|---|---|
| 4,433,418 | 2/1984 | Smith | 372/95 |
| 4,719,639 | 1/1988 | Tulip | 372/66 |
| 4,805,182 | 2/1989 | Laakmann | 372/82 |
| 5,048,048 | 9/1991 | Nishimae et al. | 372/95 |
| 5,065,405 | 11/1991 | Laakmann et al. | 372/92 |
| 5,123,028 | 6/1992 | Hobart et al. | 372/95 |
| 5,220,577 | 6/1993 | Opower | 372/92 |
| 5,392,308 | 2/1995 | Welch et al. | 372/92 |

OTHER PUBLICATIONS

Dutov et al., "Experimental and computer investigations of slab waveguide RF–excited $CO_2$ laser," *SPIE* 2773:23–30, 1996. No Month.

Hecht, Eugene, *Optics,* 2d ed., Addison–Wesley Publishing Co., Reading, MA, 1987, pp. 339–347. No Month.

Born, Max and Emil Wolf, *Principles of Optics—Electromagnetic Theory of Propagation, Interference and Diffraction of Light,* Pergamon Press, Oxford, England, 1964, Chap. VII, "Elements of the Theory of Interference and Interferometers," pp. 256–269. No Month.

Lowke, Phelps and Irwin, "Predicted Electron Transport Coefficients and Operating Characteristics of $CO_2$–$N_2$–He Laser Mixtures," *J. Appl. Phys.,* 44:4664–4672, Oct. 1973.

*Primary Examiner*—Rodney Bovernick
*Assistant Examiner*—Robert E. Wise
*Attorney, Agent, or Firm*—Seed and Berry LLP

[57] ABSTRACT

A laser includes a split-wave hybrid resonator that produces a high quality laser beam from a low gain laser medium. The split-wave hybrid resonator includes a resonator cavity formed by a pair of resonator mirror surfaces positioned at opposite ends of the laser medium and a pair of resonator walls positioned on opposite sides of the resonator cavity. The resonator walls are separated from each other by a separation distance such that the resonator cavity has a Fresnel number between approximately 0.5 and 1.5. At least one of the resonator walls includes a first ring oscillation filter adjacent to the lasing medium to filter out ring oscillations within the laser medium. One or more of the resonator walls may include first and second wall portions angled with respect to each other to form a wave-front splitting interferometer. The resonator mirrors are tilted off-axis with respect to the resonator walls.

33 Claims, 4 Drawing Sheets

LASER WITH SPLIT-WAVE HYBRID RESONATOR

TECHNICAL FIELD

The present invention relates generally to diffusion-cooled lasers.

BACKGROUND OF THE INVENTION

Important practical examples of diffusion-cooled lasers include radio frequency (RF) excited gas lasers and also optically pumped solid-state lasers in which the lasing medium is cooled by the heat conduction through the active lasing medium toward its externally cooled boundaries.

An RF-excited laser produces laser energy when a lasing medium within an elongated laser resonator cavity is excited by a radio frequency voltage between a pair of externally cooled electrodes. The basic transverse RF-excited gas laser was first disclosed in U.S. Pat. No. 4,169,251 to Katherine D. Laakmann ("the '251 patent"). That patent describes the laser resonator cavity as being enclosed in an elongated waveguide having two walls that are dielectrics and two walls that are the electrodes across which the RF voltage is applied.

The basic RF-excited laser evolved into high power slab gas lasers as disclosed in "Radio-Frequency Excited Stripline CO and $CO_2$ Lasers," Gabai et al., Paper TUB4 presented at Conference on Lasers and Electro-Optics, June 1984 and U.S. Pat. No. 4,719,639 to Tulip. Such high power slab lasers enable the large volume lasing medium to be efficiently excited by an RF voltage and the resulting gas discharge and cooled by thermal conductivity through the gas to large surface area slab electrodes.

An example of a prior art slab laser 10 is shown in FIG. 1. The slab laser 10 includes first and second elongated, planar slab electrodes 12, 14 parallel to each other and extending between first and second resonator mirrors 16, 18. A gas lasing medium is positioned within an optical resonator cavity 20 formed between the slab electrodes 12, 14. When the RF voltage is applied to the gas lasing medium via the slab electrodes 12, 14, a gas discharge is formed within the resonator cavity 20 and the resonator mirrors 16, 18 form a laser beam 22 from the gas discharge within the resonator cavity 20. In the laser 10 shown in FIG. 1, the resonator mirrors 16, 18 form an unstable resonator with an exit aperture 24 such that the laser beam 22 travels laterally until the laser beam exits the resonator cavity 20 via the exit aperture. The slab electrodes 12, 14 are positioned sufficiently close to each other (e.g., 2 mm) so that resonator cavity 20 acts as a waveguide with a Fresnel number less than about 0.3 (D. Hall et al., *Handbook on Molecular Lasers*, P. K. Cheo, Ed., p. 170, 1987) and thereby prevent the laser beam 22 from expanding transverse to the faces of the electrodes. The slab electrodes 12, 14 act as a waveguide in that the entire laser beam 22 is reflected off of the slab electrodes multiple times along its path between resonator mirrors 16, 18.

As shown in FIG. 1, the laser beam 22 produced by the prior art slab laser 10 exits the resonator cavity 20 via the exit aperture 24. The transmission of the laser beam 22 toward and out of the exit aperture 24 can be accomplished using a negative-branch, confocal unstable resonator 26 as shown in FIG. 2 and discussed in U.S. Pat. No. 5,048,048 to Nishimae et al. The resonator mirrors 16, 18 of the resonator 26 have opposing concave reflective surfaces 28, 30 and are confocal, i.e., have a common focal point 32 on a resonator axis 34. As can be seen in FIG. 2, the exit aperture 24 is formed between the resonator walls 12, 14 by extending the first resonator mirror 16 beyond an end 36 of the second resonator mirror 18 so that the laser beam 22 is reflected by the first resonator mirror 16 out of the resonator cavity 20 through the exit aperture 24.

The typical prior art slab laser 10 shown in FIGS. 1–2 provides a laser beam of a reasonable laser beam quality, but has drawbacks. In particular, its power output is limited because of optical losses in the waveguide cavity, and because the lowest-order mode of the laser beam formed does not match the transverse gain profile of the waveguide cavity. The transverse gain profile of the prior art waveguide slab laser 10 of FIGS. 1–2 includes a relative minimum at the center of the waveguide cavity which corresponds to the position of the relative maximum of the lowest order mode of the laser beam. As a result, the lowest order mode of the laser beam achieves less than optimum power output.

In addition, the waveguide resonator cavity must be nearly perfect in order to achieve adequate laser output. In particular, the internal walls of the slab electrodes 12, 14 must be very highly polished to perform efficient waveguiding. Efficient waveguiding implies high reflection coefficients of the walls for a wide range of incident angles. This is achieved by diamond turning of bare metal electrode surfaces (A. Dutor et al., *Proc. SPIE*, 1996, 2773, p. 23). Further, the resonator mirrors 16, 18 must be nearly perfectly aligned with the optical axis of the resonator cavity. Such near perfection diminishes durability and adds cost to the manufacture of the waveguide lasers.

Another possibility is to position the electrodes sufficiently far apart to form a free-space laser resonator cavity with a Fresnel number of about 1.5 or more. Such a free-space resonator cavity allows the laser beam formed in the resonator cavity to expand without restriction from the resonator cavity walls. However, a laser with such a free-space resonator cavity also would have limited output power because the lowest-order mode of the resulting laser beam would not match the transverse gain profile of the resonator cavity. This results in lower electro-optical efficiency of the laser compared to lasers with a better match between the mode and gain profiles.

SUMMARY OF THE INVENTION

An embodiment of the present invention is directed to a laser that receives excitation energy from an energy source. The laser includes a lasing medium that forms laser energy when excited by the excitation energy from the energy source. The laser also includes a pair of resonator mirror surfaces positioned at opposite ends of the lasing medium. The resonator mirror surfaces are configured to form the laser energy into a laser beam that extends between the resonator mirrors. The laser also includes first and second resonator walls extending between the pair of resonator mirror surfaces and positioned on opposite sides of the lasing medium. The resonator walls may include first and second wall portions angled with respect to each other. The first resonator wall includes a first ring oscillation filter adjacent to the lasing medium to filter out ring oscillations within the lasing medium.

There are many types of ring oscillation filters that can be employed to filter out the ring oscillations within the lasing medium. For example, the ring oscillation filter may include a recess in either or both of the resonator walls. Alternatively, or in addition, the ring oscillation filter may include a step in either one, or both of the resonator walls. A step is an abrupt change in the transverse separation of the resonator walls. The resonator mirror surfaces may be tilted to form an optical axis that is nonparallel with respect to the central axis of the resonator walls. This results in a laser beam with a nearly flat top, lowest order mode that will interact very efficiently with the gain profile of the resonator cavity.

DETAILED DESCRIPTION OF THE INVENTION

An embodiment of the present invention is directed to a laser with a split-wave hybrid resonator for producing a high quality laser beam from a low gain laser medium. The split-wave hybrid resonator is formed by a pair of resonator mirror surfaces positioned at opposite ends of the laser medium and a pair of resonator walls positioned on opposite sides of the laser medium. The split-wave hybrid resonator differs from prior art resonators in that the resonator walls are separated form each other by a distance greater than the separation distance of prior art waveguide resonator walls and less than the separation distance of prior art free-space resonator walls for a given resonator length. At least one of the resonator walls includes a first ring oscillation filter adjacent to the lasing medium to filter out ring oscillations within the laser medium.

Figure 3:
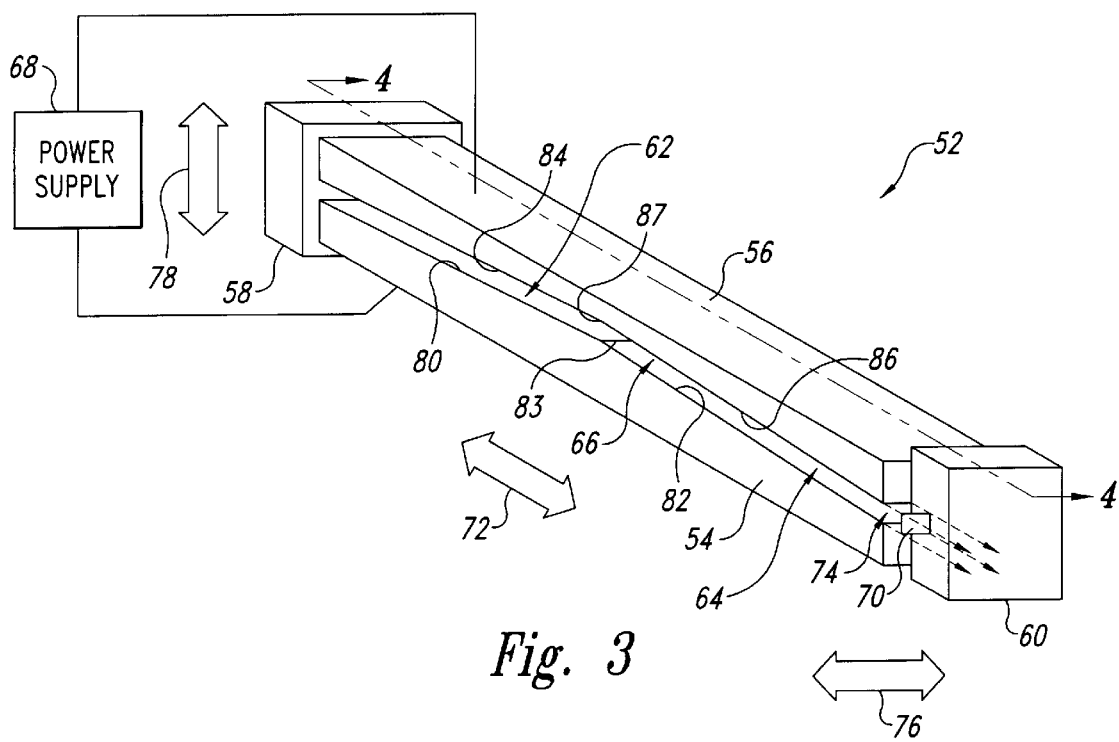
FIG. 3 is an isometric schematic illustration of a split-wave hybrid resonator laser according to a first embodiment of the present invention.

A first embodiment of the present invention is a laser 50 that produces a high quality laser beam of increased efficiency compared to prior art waveguide and free-space lasers, as shown in FIG. 3. The laser 50 includes a split-wave hybrid resonator 52 formed by first and second elongated electrodes 54, 56 and first and second resonator mirrors 58, 60. The elongated electrodes 54, 56 can be made of all metal or can be coated with a dielectric material. The length of the elongated electrodes 54, 56 depends on the output power desired and in one example is approximately 1 m. The first and second electrodes 54, 56 include interior resonator walls 62, 64, respectively, which define the transverse boundaries of a resonator cavity 66 therebetween. The resonator cavity 66 contains a gas lasing medium, such as a mixture of carbon dioxide ($CO_2$), nitrogen ($N_2$), helium (He), and xenon (Xe). However, it will be appreciated that non-gaseous lasing media could also be employed.

The laser 50 also includes a power supply 68 that applies excitation energy to the gas laser medium, which causes the laser medium to emit laser energy. The excitation energy supplied by the power supply 68 preferably is an RF voltage, but may also be microwave, pulse, direct current, or any other voltage that stimulates the laser medium into producing laser energy.

Figure 2:
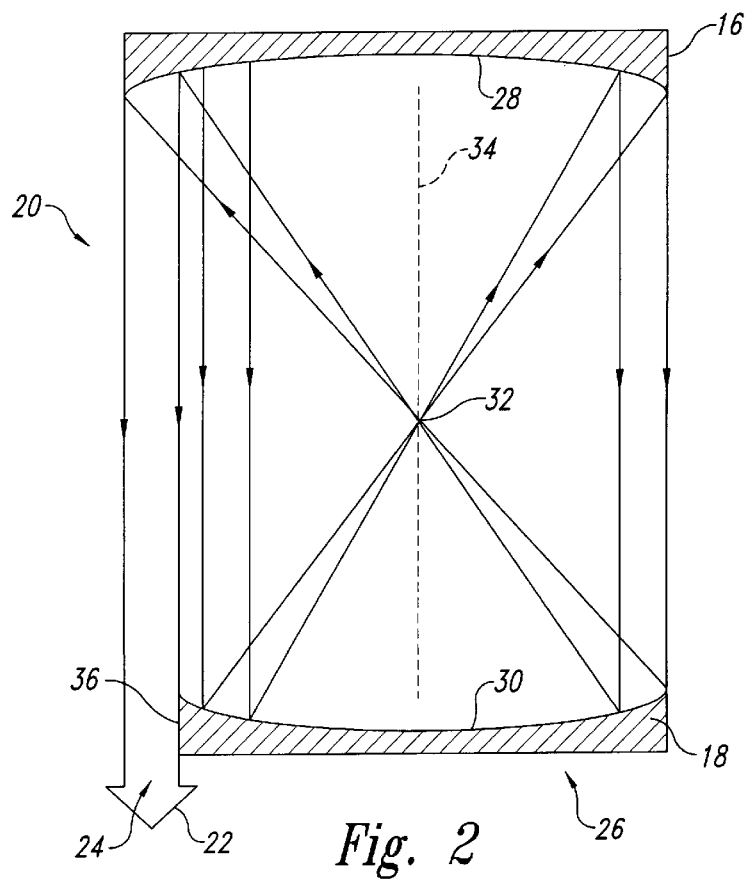
FIG. 2 is an enlarged cross-sectional view of resonator mirrors of the waveguide slab laser of FIG. 1.

The resonator mirrors 58, 60 form the laser energy into a laser beam 70 that travels back and forth in a longitudinal direction 72 within the resonator cavity 66 between the resonator mirrors. The resonator mirrors 58, 60 form an unstable resonator with an exit aperture 74 such that the laser beam 70 travels in a lateral direction 76, transverse to the longitudinal direction 72, until the laser beam exits the resonator cavity 66 via the exit aperture 74. The exit aperture 74 is formed by extending the first resonator mirror 58 beyond the second resonator mirror 60 in the lateral direction 76 such that the laser beam 70 is reflected by the first resonator mirror 58 past the end of the second resonator mirror 60 and out of the resonator cavity 66 via the exit aperture 74. The resonator mirrors 58, 60 can form a resonator of either confocal, such as that shown in FIG. 2, or non-confocal type.

Figure 1:
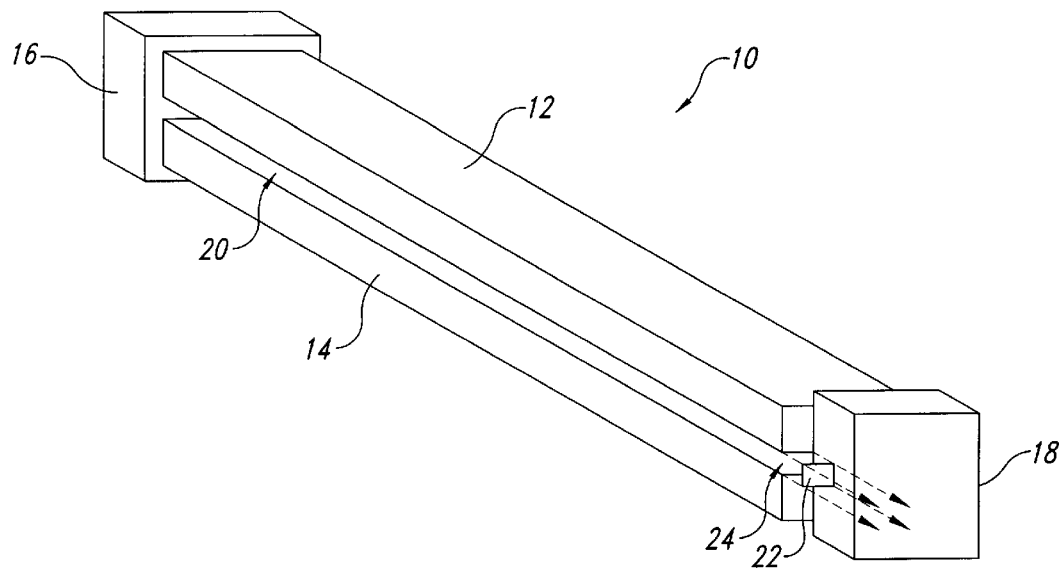
FIG. 1 is an isometric schematic illustration of a prior art waveguide slab laser.

The laser 50 of FIG. 3 differs from prior art lasers in that the electrodes 54, 56 are spaced from each other in a transverse direction 78 by a separation distance (e.g., approximately 4–8 mm) that is greater than the separation distance (e.g., 1–3 mm) between the slab electrodes 12, 14 of the waveguide laser 10 shown in FIG. 1 and less than the separation distance (e.g., approximately greater than 8 mm) between electrodes of prior art free-space lasers for a given electrode length (e.g., 1 m). In other words, the split-wave hybrid resonator 52 has a Fresnel number between approximately 0.5 and 1.5 compared to Fresnel numbers of less than approximately 0.3 for waveguide lasers and greater than approximately 1.5 for free-space lasers. As a result, most of the laser beam 70 inside the resonator cavity 56 is free-space propagated in the transverse direction 78 between the resonator mirrors 58, 60, that is, most of the laser beam 70 does not contact the resonator walls 62, 64 of the electrodes 54, 56. Edges of the laser beam 70 are split from the laser beam by reflecting off the resonator walls 62, 64 back into the resonator cavity 66. A stable and spatially coherent interference pattern is formed inside the resonator cavity 66 by the free-space main portion and reflected edges of the intra-cavity laser beam 70. Thus, the resonator walls act as a wave-front splitting interferometer similar to the Fresnel double mirror or Lloyd mirror interferometer (E. Hecht, *Optics*, 1987, p. 245).

In contrast to the highly polished resonator walls of prior art waveguide lasers, the resonator walls 62, 64 of the split-wave hybrid resonator 52 do not need to be highly polished because the resonator walls do not waveguide the laser beam 70. In fact, the surfaces of the resonator walls 62, 64 preferably remain unpolished and/or coated with a dielectric, such as aluminum oxide, in order to inhibit high order modes of the laser beam 70. High reflectivity and low optical loss result only for shallow angles of incidences of light of the lowest order mode. As such, rather than being a drawback, the unpolished resonator walls 62, 64 are less expensive to manufacture than the highly polished resonator walls of the prior waveguide lasers and also improve laser efficiency.

In contrast to prior art waveguide lasers, the resonator walls 62, 64 of the split-wave hybrid resonator 52 are bent to ensure that the higher order modes of the laser beam 70 are eliminated by contacting the unpolished surfaces of the resonator walls. In particular, the first resonator wall 62 includes a first resonator wall portion 80 and a second resonator wall portion 82 that are angled outwardly with respect to each other at a lateral bend 83 as shown in FIG. 3. Similarly, the second resonator wall 64, has a first resonator wall portion 84 and a second wall resonator portion 86 angled inwardly with respect to each other at a lateral bend 87. The angle (e.g., 0.4–0.6 mrad) between the wall portions 80, 82 of the first resonator wall 62 at a lateral bend 83 may be equal to the angle between the wall portions, 84, 86 of the second resonator wall 64 at the lateral bend 87 such that the first resonator wall portions 80, 84 are parallel to each other as are the second resonator wall portions 82, 86, but such parallelism is not required.

It has been determined that mode quality and laser output power of the laser 50 can be improved by tilting the resonator mirrors 58, 60 slightly off axis with respect to the central axis of the resonator cavity 66. For example, by making one or both of the resonator mirrors 58, 60 tilted by 1–3 mrad relative to the optical axis of the resonator mirrors 58, 60, the higher order modes of the laser beam 70 can be eliminated while improving laser efficiency of the main, lowest order mode of the laser beam 70. Laser efficiency is improved because the lowest order mode of the laser beam 70 travels through the highest gain portions of the resonator cavity 66, which are adjacent to the resonator walls 62, 64. This contrasts with prior art waveguide and free-space lasers in which the lowest order modes of the laser beams are positioned at the centers of the resonator cavities which are the lowest gain portions of the resonator cavities. The coincidence of the lowest order mode with the high gain portions of the resonator cavity 66 results in a low divergent intracavity laser beam 70 that has a nearly flat top (super-Gaussian) transverse structure having a very large mode volume fill factor that is desirable for high electro-optical efficiency operation of the laser 50.

Figure 4:
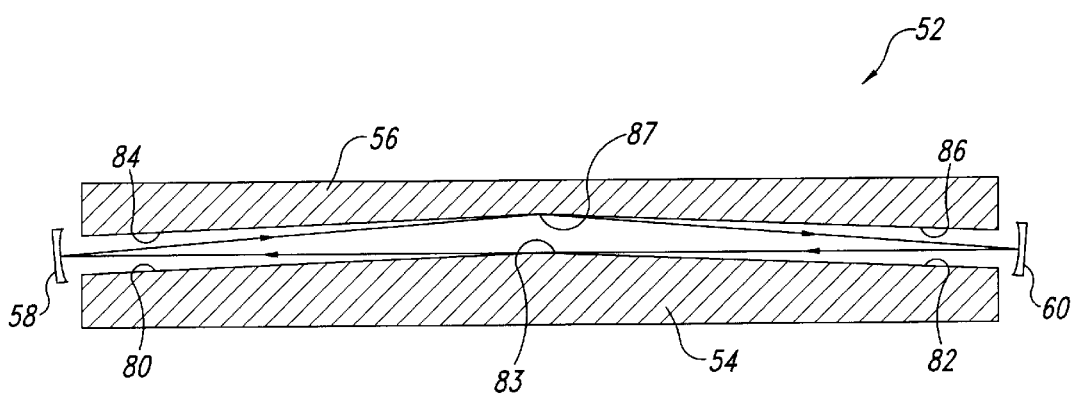
FIG. 4 is a cross-sectional view of the split-wave hybrid resonator of the laser shown in FIG. 1 taken along line 4—4.

One potential problem of split-wave hybrid resonators, such as the resonator 52 shown in FIG. 3, is that ring oscillations can develop within the resonator cavity, which can reduce laser efficiency. Such ring oscillations are laser modes that propagate off of the resonator mirrors 58, 60 and resonator walls 62, 64 in such a way as to make either a clockwise or counterclockwise round trip within the resonator cavity 66 as shown in FIG. 4, which is a cross-sectional view of the split-wave hybrid resonator 52 of FIG. 3. Ring oscillations interact very effectively with the gas lasing medium which, as discussed above, has relatively high gain portions adjacent to the resonator walls 62, 64. As a result, the ring oscillations significantly reduce the efficiency for the main, lowest order mode of the laser beam 70. Moreover, the ring oscillations can be detected in the mid-field or the far-field outside the split-wave hybrid resonator 52 because a ring oscillation propagates at an angle greater than the angle of defraction of the lowest order mode of the laser beam 70.

One way to eliminate such ring oscillations is to create a ring oscillation filter in one or both of the resonator walls 62, 64. Such ring oscillation filters can be built as an irregularity in the optical surfaces of the resonator walls, such as a recess or step or any other device for increasing optical losses for the ring oscillations. Examples of such ring oscillation filters are discussed below with respect to FIGS. 5–8.

Figure 5:
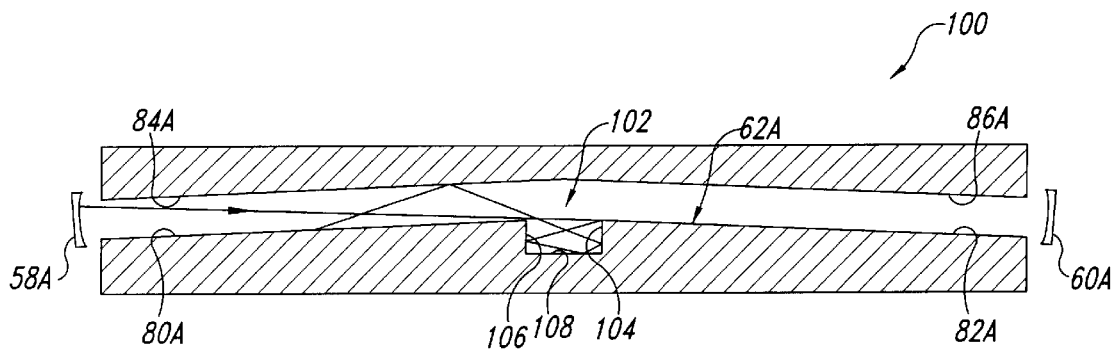
FIG. 5 is a cross-sectional view of a split-wave hybrid resonator according to a second embodiment of the present invention.

A split-wave hybrid resonator 100 according to a second embodiment of the invention is shown in FIG. 5. The split-wave hybrid resonator 10 shown in FIG. 5 is substantially identical to the split-wave hybrid resonator 52 shown in FIGS. 3–4 except that the split-wave hybrid resonator 100 includes a ring oscillation filter 102 formed in a first resonator wall 62A. The elements of the split-wave hybrid resonator 100 that are similar or identical to corresponding elements of the split-wave hybrid resonator 52 are labeled with the same reference number followed by the letter "A." As shown in FIG. 5, the ring oscillation filter 102 is a recess in the first resonator wall 62A approximately at the midpoint of the first resonator wall. However, it will be appreciated that the location of the ring oscillation filter 102 along the length of the first resonator wall 62A will vary depending on the tilt of each of the resonator mirrors 58A, 60A and the angle and location of the bends of the first and second resonator walls 62A, 64A.

The recess of the ring oscillation filter 102 is defined by first sidewall 104, second sidewall 106, and bottom wall 108. FIG. 5 shows the sidewalls 104, 106 each being perpendicular to the bottom wall 108, but other angles could also be employed. As shown in FIG. 5, any laser modes that enter the ring oscillation filter 102 will reflect off one or more of the sidewalls 104, 106 and the bottom wall 108. As a result, the laser mode is reflected at sharp angles off of the ring oscillation filter walls and the resonator walls which creates sufficient losses to substantially eliminate the ring oscillations. In the split-wave resonator 100, the resonator walls 62A, 64A are approximately 1 m long, the ring oscillation filter sidewalls 104, 106 are approximately 1–2 mm and the bottom wall 108 is approximately 1.3 cm.

The ring oscillation filter 102 filters the ring oscillations without inducing substantial losses on the lowest order mode of the laser beam 70 because only the edges of the lowest order mode interact with the resonator walls 62A, 64A. In addition, a "ring only" selective loss mechanism could be introduced to accentuate the losses imparted to the ring oscillations while minimizing the losses imparted to the lowest order laser beam mode. Such a selective loss mechanism could be obtained by employing strong incident angle-dependent reflectivities on the surfaces of the resonator walls 62A, 64A. This incident angle-dependent reflectivity can be achieved with some dielectric coatings, which also provide a powerful and effective method of mode purity control in the split-wave hybrid resonator 100.

Figure 6:
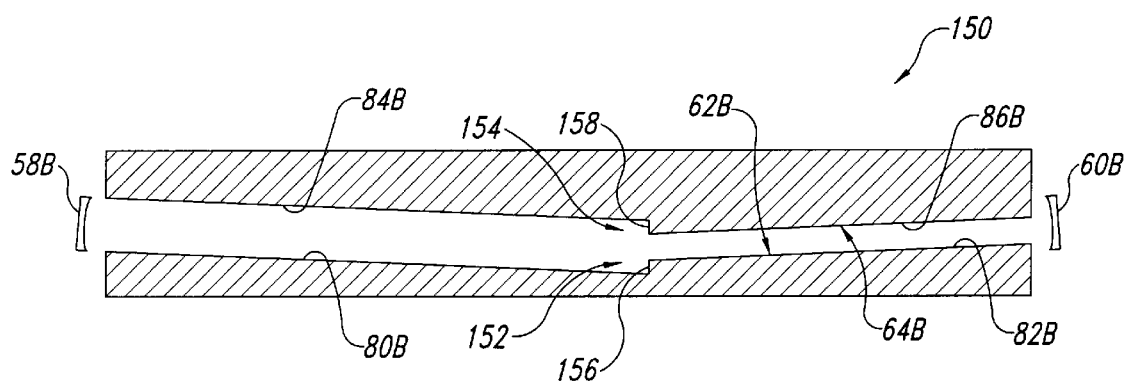
FIG. 6 is a cross-sectional view of a split-wave hybrid resonator according to a third embodiment of the present invention.

A split-wave hybrid resonator 150 according to a third embodiment of the invention is shown in FIG. 6. The split-wave hybrid resonator 150 includes a first ring oscillation filter 152 in a first resonator wall 62B and a second ring oscillation filter 154 in a second resonator wall 64B. Each of the ring oscillation filers 152, 154 is a step of approximately 0.1–0.2 mm in its respective resonator wall. In particular, the first resonator wall 62B includes a first wall portion 80B, a second wall portion 82B, and a step wall 156 connecting the wall portions to each other. Similarly, the second resonator wall 64B includes a first wall portion 84B, a second wall portion 86B, and a step wall 158 connecting the wall portions 84B, 86B to each other. The first ring oscillation filter 152 is effective at filtering out ring oscillations that proceed in the counterclockwise direction while the second ring oscillation filter 154 filters out ring oscillations proceeding in the clockwise direction. The ring oscillation filters 152, 154 operate in a manner similar to that discussed above with respect to the recess-type ring oscillation filter 102 shown in FIG. 5, that is, the ring oscillation filters reflect the ring oscillations at sharp angles to produce substantial losses in the ring oscillations.

Figure 7:
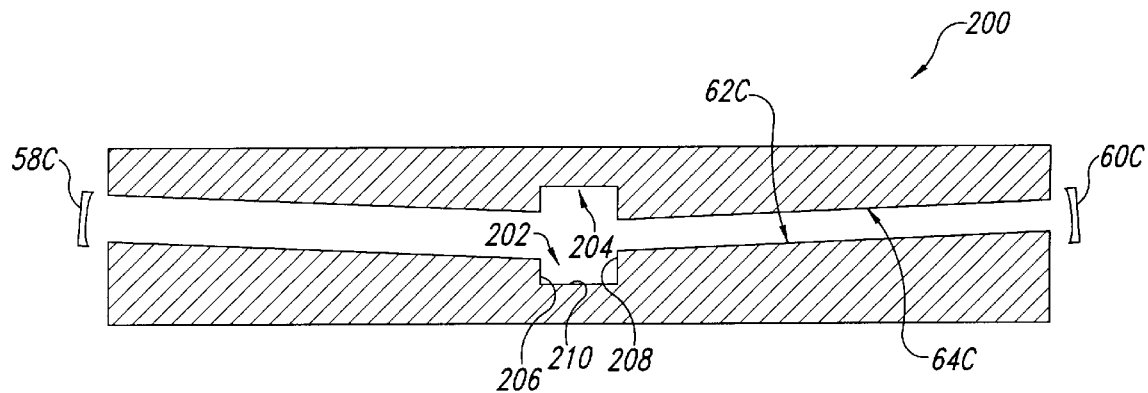
FIG. 7 is a cross-sectional view of a split-wave hybrid resonator according to a fourth embodiment of the present invention.

A split-wave hybrid resonator 200 according to a fourth embodiment of the present invention if shown in FIG. 7. Like the split-wave hybrid resonator 150 shown in FIG. 6, the split-wave hybrid resonator 200 shown in FIG. 7 includes first and second ring oscillation filters 202, 204 in first and second resonator walls 62C, 64C, respectively.

Each of the ring oscillation filters 202, 204 includes both a recess-type filter and a step-type filter. The first ring oscillation filter 202 includes a first sidewall 206, a second sidewall 208, and a bottom wall 210 that together create a recess-type filter similar to the recess-type filter 102 shown in FIG. 5. In addition, the second sidewall 208 is longer than the first sidewall 206 to create a step-type filter similar to the step-type filters 152, 154 shown in FIG. 6. In the embodiment shown in FIG. 7, the first sidewall 206 is approximately 2 mm, the second sidewall 208 is approximately 2.2 mm, and the bottom wall 210 is approximately 1.3 cm, although those skilled in the art will recognize that other dimensions are possible to create an effective ring oscillation filter. Similarly, the second ring oscillation filter 204 includes a first sidewall 212, a second sidewall 214, and a top wall 216 that can be sized and positioned symmetrically with respect to the walls of the first ring oscillation filter 202. Together the first and second ring oscillation filters 202, 204 are highly effective to create losses in the ring oscillations to the extent that the ring oscillations can be substantially totally eliminated.

Figure 8:
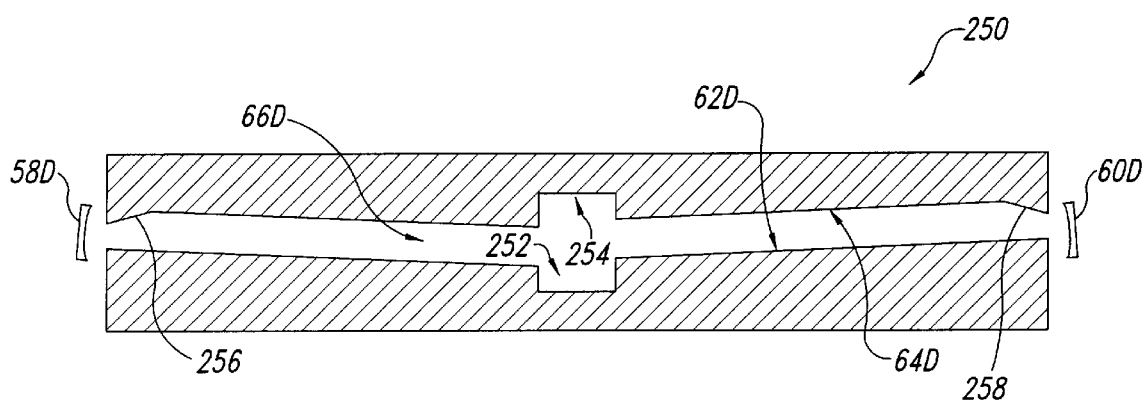
FIG. 8 is a cross-sectional view of a split-wave hybrid resonator according to a fifth embodiment of the present invention.

A split-wave resonator cavity 250 according to a fifth embodiment of the invention is shown in FIG. 8. Like the split-wave hybrid resonator 200 shown in FIG. 7, the split-wave hybrid resonator 250 includes first and second ring oscillation filters 252, 254 that are each of both the recessed-type and the step-type. In fact the first ring oscillation filter 252 is substantially identical to the first ring oscillation filter 202 of FIG. 7 while the second ring oscillation filter 254 is a mirror image of the second oscillation filter 204 of FIG. 7. As with the ring oscillation filters shown in FIGS. 5–7, the ring oscillation filters 252, 254 can be positioned in many places along the length of the resonator walls 62D, 64D depending on the tilt angle of the resonator mirrors 58D, 60D. In addition, the second resonator wall 64D also includes bends 256, 258 adjacent to the first and second mirrors 58D, 60D, respectively. The bends 256, 258 can assist in suppressing higher order laser beam modes. In addition, the bends 256, 258 also help to ensure that the main, lowest order laser beam mode passes through the high gain portions of the resonator cavity 66D, which are adjacent to the resonator walls 62D, 64D.

It will be appreciated based on the foregoing discussion that the present invention provides a diffusion-cooled laser with a split-wave hybrid resonator that provides higher output efficiency than prior art waveguide and free-space resonators. Because only a small fraction of the laser beam formed in the split-wave hybrid resonator is reflected off of the resonator walls, the resonator walls do not need to be highly polished. As a result, the resonator walls of the split-wave hybrid resonator are less expensive to manufacture than the highly polished resonator walls of prior art waveguide resonators. In addition, the ring oscillation filters of the split-wave hybrid resonator prevent ring oscillations from reducing the output efficiency of the main, lowest order laser beam mode. As a result, the output efficiency of the laser employing the split-wave hybrid resonator is greater than prior art waveguide and free-space lasers while also being less expensive to manufacture.

It should be understood that even though numerous features and advantages of the present invention have been set forth in the foregoing description, the above disclosure is illustrative only. For example, the dimensions given for the various elements of the split-wave hybrid resonators of the present invention are exemplary only and could be modified by those skilled in the art in light of the foregoing discussion. Changes may be made in detail and yet remain within the broad principles of the present invention.

We claim:

1. A laser that receives excitation energy from an energy source, comprising:
    a lasing medium that forms laser energy when excited by the excitation energy from the energy source;
    a pair of resonator mirror surfaces positioned at opposite ends of the lasing medium, the resonator mirror surfaces being configured to form the laser energy into a laser beam that extends between the resonator mirror surfaces; and
    first and second resonator walls extending between the pair of resonator mirror surfaces and positioned on opposite sides of the lasing medium, the first resonator wall including a first laser filter adjacent to the lasing medium, the first laser filter including a first step in the first resonator wall.

2. The laser of claim 1 wherein the first laser filter includes a recess in the first resonator wall, the recess being defined on a first side by the first step and on a second side by a second step in the first resonator wall.

3. The laser of claim 2 wherein the first step is larger than the second step.

4. The laser of claim 2 wherein the second resonator wall includes a recess that acts as a second laser filter.

5. The laser of claim 1 wherein the second resonator wall includes a second laser filter adjacent to the lasing medium, the second laser filter including a first step in the second resonator wall.

6. The laser of claim 1 wherein the first resonator wall includes first and second wall portions angled outwardly with respect to each other at the first laser filter.

7. The laser of claim 6 wherein the second resonator wall includes first and second wall portions angled inwardly with respect to each other, the first wall portion of the first resonator wall being parallel to the first wall portion of the second resonator wall and the second wall portion of the first resonator wall being parallel to the second wall portion of the second resonator wall.

8. The laser of claim 6 wherein the second resonator wall includes first and second wall portions angled with respect to each other such that the first wall portions diverge from or converge toward each other and the second wall portions diverge from or converge toward each other.

9. The laser of claim 1 wherein the first resonator wall includes first and second wall portions angled inwardly with respect to each other at the first laser filter.

10. The laser of claim 1 wherein the resonator walls form a cavity with a cavity axis and the resonator mirror surfaces are tilted with respect to the resonator walls such that the cavity axis is non-aligned with a resonator axis of the resonator mirror surfaces.

11. The laser of claim 1 wherein each of the resonator mirror surfaces is concave and the resonator mirror surfaces are positioned to form an unstable, confocal resonator.

12. The laser of claim 1 wherein the energy source is an RF energy source and the lasing medium is excited by RF energy from the RF energy source.

13. The laser of claim 1 wherein the resonator walls are metal coated with a dielectric material.

14. A laser that receives excitation energy from an energy source, comprising:
    a resonator cavity formed by first and second elongated resonator walls each having a width that allows for free-space propagation of a laser beam within the resonator cavity in a lateral direction transverse to the elongation of the resonator walls, at least one of the resonator walls having a lateral bend such that the resonator wall is not entirely on a single plane, the resonator walls being separated from each other by a separation distance such that the resonator cavity has a Fresnel number between approximately 0.5 and 1.5;

a lasing medium disposed within the resonator cavity, the lasing medium forming laser energy when excited by the excitation energy from the energy source; and a pair of resonator mirror surfaces positioned at opposite ends of the resonator cavity, the resonator mirror surfaces being configured to form the laser energy into a laser beam that extends between the resonator mirror surfaces, the resonator mirror surfaces being tilted with respect to the resonator walls such that an optical axis of the resonator mirror surfaces is not co-linear with a central axis of the resonator cavity.

15. The laser of claim 14 wherein the first resonator wall includes a first laser filter adjacent to the lasing medium, the first laser filter being structured to filter out portions of the laser beam while leaving a lowest order mode of the laser beam substantially unfiltered.

16. The laser of claim 15 wherein the first laser filter includes a recess in the first resonator wall.

17. The laser of claim 15 wherein the first laser filter also includes a step in the first resonator wall.

18. The laser of claim 15 wherein the second resonator wall includes a second laser filter adjacent to the lasing medium, the first laser filter being structured to filter out portions of the laser beam while leaving a lowest order mode of the laser beam substantially unfiltered.

19. The laser of claim 14 wherein the first resonator wall includes first and second wall portions are angled outwardly with respect to each other at the lateral bend.

20. The laser of claim 19 wherein the second resonator wall includes first and second wall portions angled inwardly with respect to each other, the first wall portion of the first resonator wall being parallel to the first wall portion of the second resonator wall and the second wall portion of the first resonator wall being parallel to the second wall portion of the second resonator wall.

21. The laser of claim 19 wherein the second resonator wall includes first and second wall portions angled with respect to each other such that the first wall portions diverge from or converge toward each other and the second wall portions diverge from or converge toward each other.

22. The laser of claim 21 wherein the resonator walls are metal coated with a dielectric material.

23. The laser of claim 14 wherein the resonator walls are metal coated with a dielectric material.

24. The laser of claim 14 wherein the energy source is an RF energy source and the lasing medium is excited by RF energy from the RF energy source.

25. A laser that receives excitation energy from an energy source, comprising:

a lasing medium that forms laser energy when excited by the excitation energy from the energy source;

a pair of resonator mirror surfaces positioned at opposite ends of the lasing medium, the resonator mirror surfaces being configured to form the laser energy into a laser beam that extends between the resonator mirror surfaces; and a resonator cavity formed by first and second elongated resonator walls extending between the resonator mirror surfaces, the resonator walls being separated from each other by a separation distance such that the resonator cavity has a Fresnel number between approximately 0.5 and 1.5, the first resonator wall including a first filter adjacent to the lasing medium, the first laser filter being structured to filter out portions of the laser beam while leaving a lowest order mode of the laser beam substantially unfiltered.

26. The laser of claim 25 wherein the first laser filter includes a recess in the first resonator wall.

27. The laser of claim 25 wherein the first laser filter includes a step in the first resonator wall.

28. The laser of claim 25 wherein the second resonator wall includes a second laser filter adjacent to the lasing medium, the first laser filter being structured to filter out portions of the laser beam while leaving a lowest order mode of the laser beam substantially unfiltered.

29. The laser of claim 25 wherein the first resonator wall includes first and second wall portions angled inwardly with respect to each other at the first laser filter.

30. The laser of claim 29 wherein the second resonator wall includes first and second wall portions angled outwardly with respect to each other, the first wall portion of the first resonator wall being parallel to the first wall portion of the second resonator wall and the second wall portion of the first resonator wall being parallel to the second wall portion of the second resonator wall.

31. The laser of claim 25 wherein the second resonator wall includes first and second wall portions angled with respect to each other such that the first wall portions diverge from or converge toward each other and the second wall portions diverge from or converge toward each other.

32. The laser of claim 25 wherein the resonator cavity has a central longitudinal axis and the resonator mirror surfaces are tilted with respect to the resonator walls such that the central longitudinal axis is non-aligned with a resonator axis of the resonator mirror surfaces.

33. The laser of claim 25 wherein the lasing medium is a gas that includes carbon dioxide and the energy source is an RF energy source that excites the gaseous lasing medium with RF energy.

* * * * *